(12) United States Patent
White

(10) Patent No.: US 8,819,736 B2
(45) Date of Patent: Aug. 26, 2014

(54) SYSTEM FOR PRESENTING MEDIA PROGRAMMING GUIDES

(71) Applicant: AT&T Intellectual Property I, LP, Atlanta, GA (US)

(72) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 14/191,928

(22) Filed: Feb. 27, 2014

(65) Prior Publication Data

US 2014/0181872 A1    Jun. 26, 2014

Related U.S. Application Data

(63) Continuation of application No. 14/031,196, filed on Sep. 19, 2013, which is a continuation of application No. 13/678,866, filed on Nov. 16, 2012, now Pat. No. 8,566,878, which is a continuation of application No. 11/777,364, filed on Jul. 13, 2007, now Pat. No. 8,341,674.

(51) Int. Cl.
*H04N 5/445*    (2011.01)
*H04N 21/482*    (2011.01)
*H04N 21/25*    (2011.01)

(52) U.S. Cl.
CPC .......... *H04N 21/252* (2013.01); *H04N 21/482* (2013.01)
USPC ................ 725/46; 725/39; 725/44; 725/45

(58) Field of Classification Search
CPC . H04N 21/482; H04N 21/4826; H04N 21/25; H04N 21/251; H04N 21/252
USPC .............................................. 725/39, 44–49
See application file for complete search history.

(56) References Cited

U.S. PATENT DOCUMENTS

| | | |
|---|---|---|
| 5,758,257 A | 5/1998 | Herz |
| 5,801,787 A | 9/1998 | Schein |
| 5,812,123 A | 9/1998 | Rowe |
| 5,850,218 A | 12/1998 | Lajoie |
| 6,670,971 B1 | 12/2003 | Oral |
| 7,134,133 B1 | 11/2006 | Wugofski |
| 2002/0010932 A1 | 1/2002 | Nguyen |
| 2005/0028208 A1 | 2/2005 | Ellis |
| 2006/0174277 A1 | 8/2006 | Sezan |

*Primary Examiner* — Nicholas Corbo
(74) *Attorney, Agent, or Firm* — Guntin & Gust, PLC; Andrew Gust

(57) ABSTRACT

A system for presenting media programming guides is disclosed. A system that incorporates teachings of the present disclosure may include, for example, a media receiver having a controller element to generate a Media Program Guide (MPG) that groups media programs according to a redundancy of media programs and a viewing history of a subscriber of the media receiver. Other embodiments are disclosed.

20 Claims, 5 Drawing Sheets

200

SYSTEM FOR PRESENTING MEDIA PROGRAMMING GUIDES

CROSS-REFERENCE TO RELATED APPLICATIONS

This application is a continuation of and claims priority to U.S. patent application Ser. No. 14/031,196 filed Sep. 19, 2013, which is a continuation of and claims priority to U.S. patent application Ser. No. 13/678,866 filed Nov. 16, 2012 (now U.S. Pat. No. 8,566,878), which is a continuation of and claims priority to U.S. patent application Ser. No. 11/777,364 filed Jul. 13, 2007 (now U.S. Pat. No. 8,341,674). The contents of each of the foregoing are hereby incorporated by reference into this application as if set forth herein in full.

FIELD OF THE DISCLOSURE

The present disclosure relates generally to media guides and more specifically to a system for presenting media programming guides.

BACKGROUND

Current implementations of Electronic Programming Guides (EPGs) are typically presented in a flat graphical user interface in a calendar matrix. With hundreds of media channels and corresponding media programs available on a weekly basis, navigating through an EPG can be daunting to subscribers.

A need therefore arises for a system for presenting media programming guides.

DETAILED DESCRIPTION

Broadly stated, embodiments in accordance with the present disclosure provide a system for presenting media programming guides.

In one embodiment of the present disclosure, a computer-readable storage medium can have computer instructions for collecting a viewing history of media programs, receiving a request for presentation of an Electronic Programming Guide (EPG), scanning the EPG for redundant media programs, grouping the redundant media programs, reorganizing the EPG according to the grouped media programs and the viewing history of media programs, and presenting the reorganized EPG.

In one embodiment of the present disclosure, a media receiver can have a controller element to generate a Media Program Guide (MPG) that groups media programs according to a redundancy of media programs and a viewing history of a subscriber of the media receiver.

In one embodiment of the present disclosure, a computer-readable storage medium operating as an Internet portal can have computer instructions for presenting at an Internet browser operating from a communication device an MPG that groups media programs according to a redundancy of media programs and a viewing history of a subscriber of a media receiver.

Figure 1:
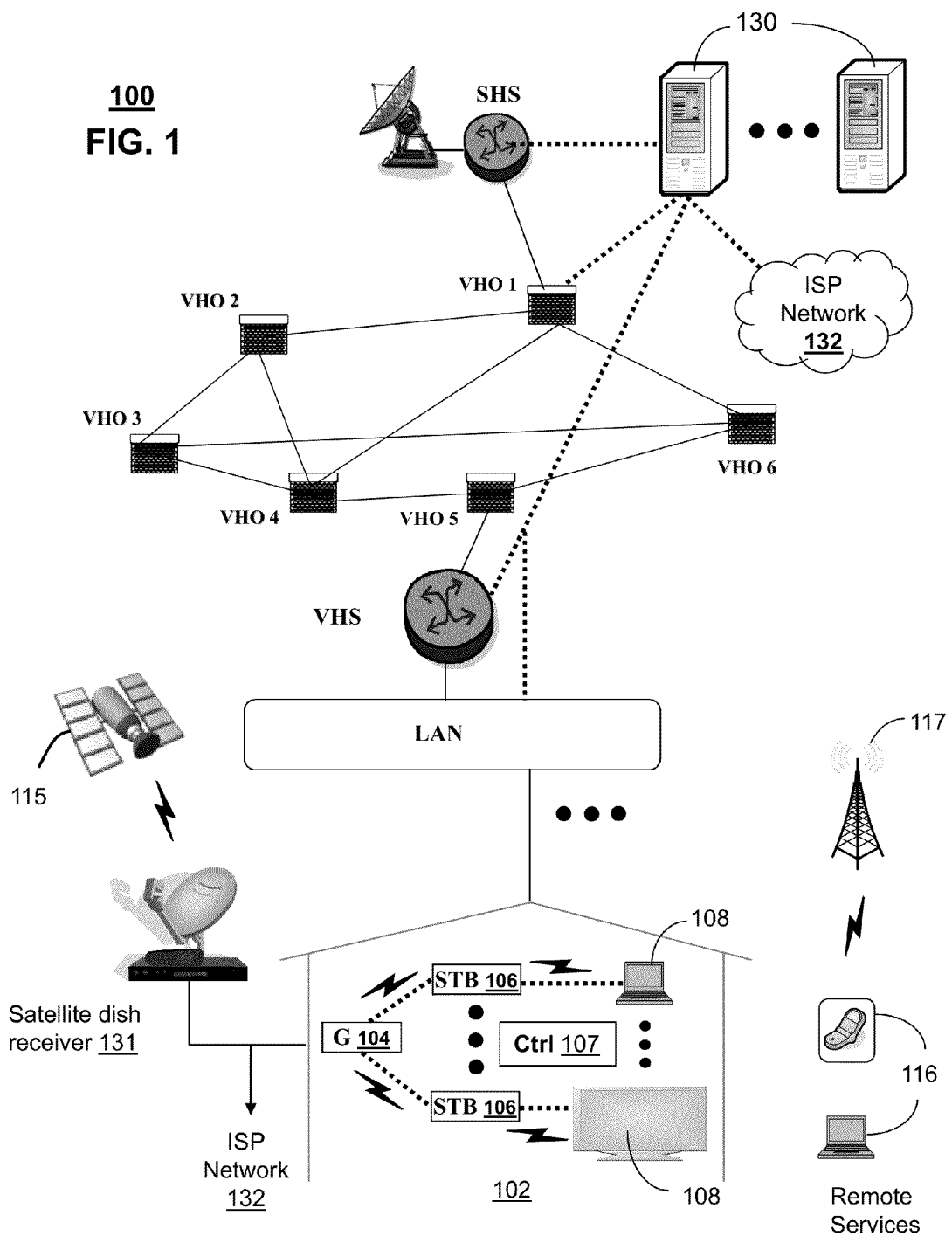
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system for services such as video-on-demand (VoD).

The IPTV media system can be coupled to one or more computing devices 130 that can operate as a web server for providing portal services over an Internet Service Provider (ISP) network 132 to fixed media devices 108 or portable communication devices 116 by way of a wireless base station 117 such as in a cellular communication network operating with common protocols (GSM, CDMA, etc.).

A satellite broadcast system can be used in place of the IPTV media system. In this embodiment, signals transmitted by a satellite 115 can be intercepted by a satellite dish receiver 131 coupled to building 102 which conveys media signals to the media receivers 106. The media receivers 106 can be equipped with a broadband port to the ISP network 132. Although not shown, the communication system 100 can also be combined or replaced with analog or digital broadcast distributions systems such as cable systems. It would be apparent therefore to one of ordinary skill in the art that the present disclosure can be applied to any broadcast media system.

Figure 2:
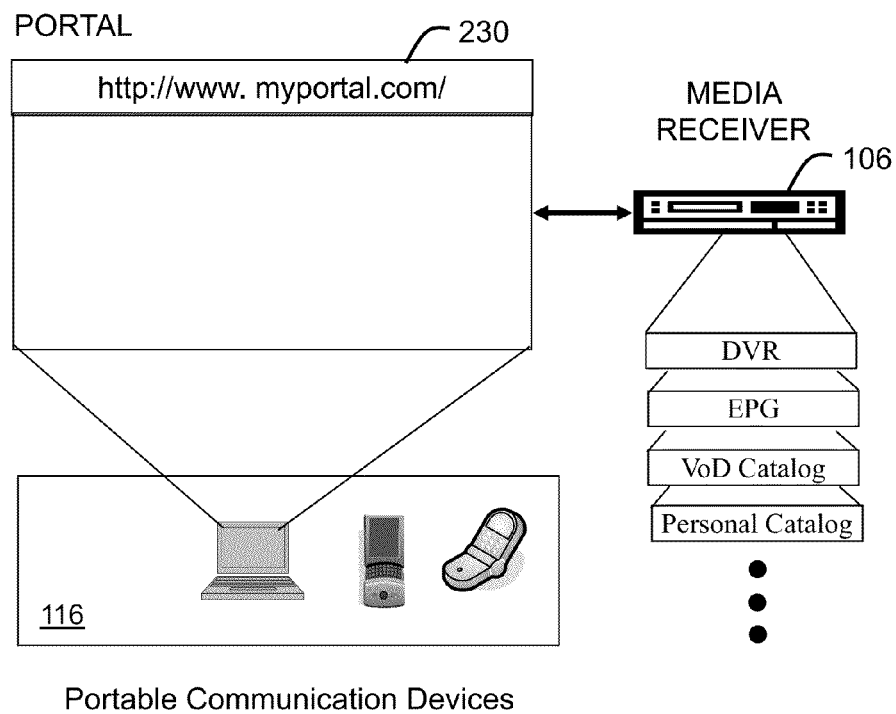
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable portable communication device 116. The portal 230 can be configured to access a media receiver 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
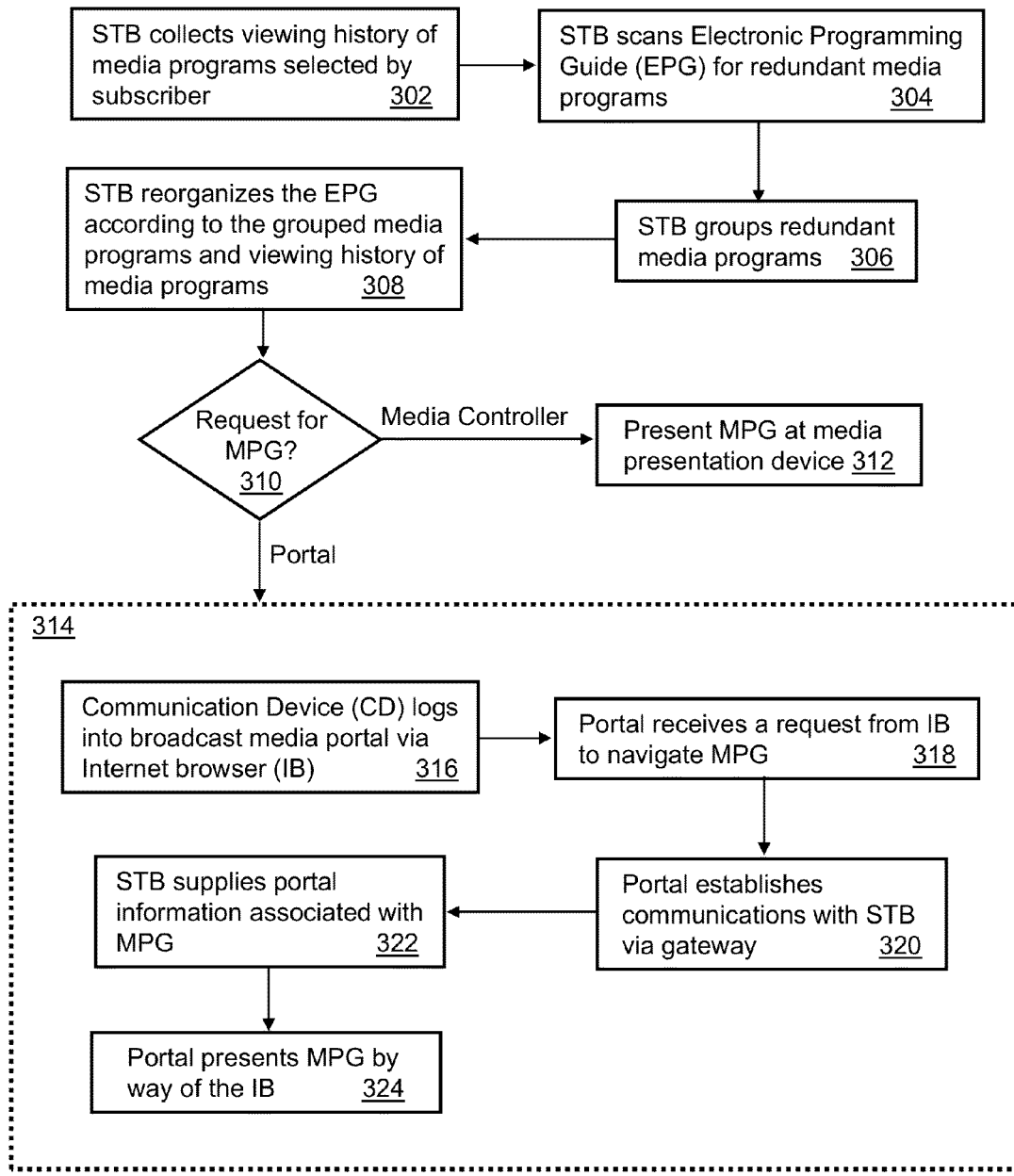
FIG. 3 depicts an exemplary method operating in portions of the communication system.

FIG. 3 depicts an exemplary method 300 operating in portions of the communication system 100. Method 300 begins with step 302 in which a media receiver 106 such as the STB of FIG. 1 collects by common means a viewing history of media programs selected by the subscriber of said STB. The viewing history can correspond to TV programs, VoD movies, DVR recordings, and other services of the STB experienced in whole or in part by the subscriber. The viewing history progressively collected can be stored in a memory of the STB and purged if desired by the subscriber. The history collected can be in the form of metadata associated with media programs which can be stored efficiently without utilizing excessive storage resources of the STB.

In step 304, the STB can be programmed to scan the EPG for redundant media programs. For example, a particular TV show or movie may play several times during the day, week, or month. Rather than maintain a flat presentation structure based on a calendar viewing structure used by prior EPGs, the STB can scan for multiple viewings of the same media program, and group each media program in step 306. From the collected viewing history of the subscriber, and from the redundant groupings of redundant media programs, the STB can be programmed in step 308 to reorganize the EPG so that redundant viewings are collapsed in one location, and programs already viewed are isolated. The end result would be a media program guide (MPG) corresponding to the reorganized EPG.

Figure 4:
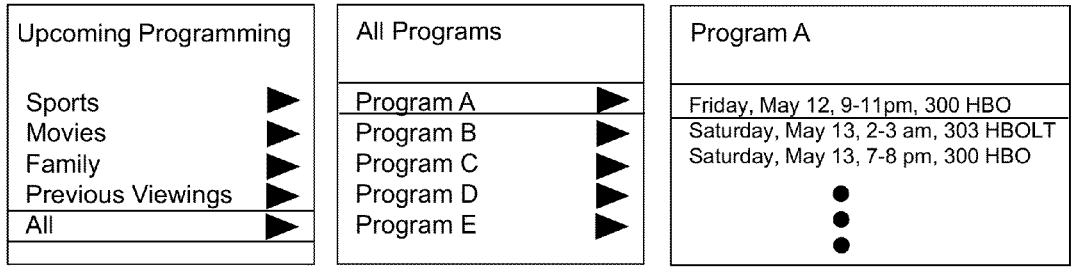
FIG. 4 depicts exemplary embodiments for presenting a media programming guide according to the method of FIG. 3.
Figure 4:
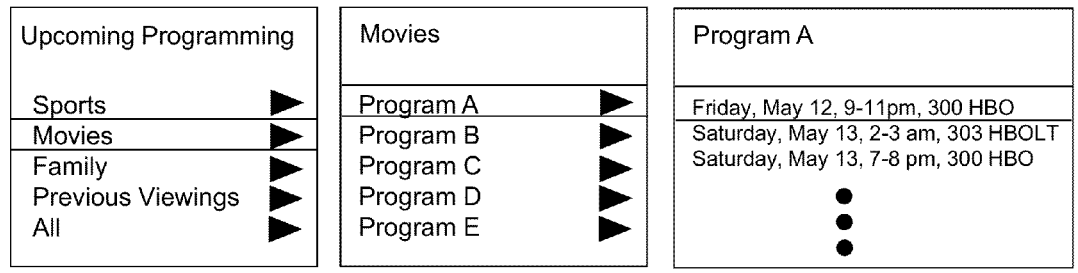
Figure 4:
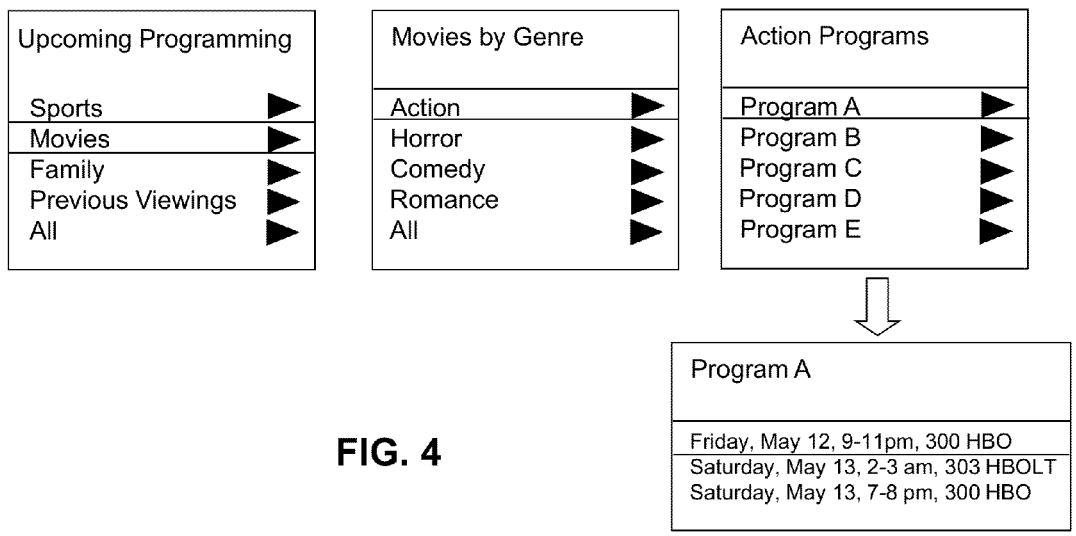

FIG. 4 depicts exemplary embodiments of the MPG. FIG. 4 is illustrative of three embodiments for presenting the MPG. It would be appreciated by one ordinary skill in the art that there can be innumerable embodiments of the MPG. However, the embodiments of FIG. 4 are sufficient to direct an artisan of ordinary skill in the art to determine those embodiments not described herein. With this in mind, the MPG can be organized into sub-groupings. In a first Graphical User Interface (GUI) window ("Upcoming Programming") the sub-groupings can be as follows: "Sports," "Movies," "Family," "Previous Viewings", and "All." "Sports" can be a grouping for all media programs related to sports. "Movies" can be a grouping for movies (TV, VoD, or DVR). "Family" can be a grouping for all family oriented media programs (e.g., Nickelodeon, Disney, etc.). "All" can be a grouping that aggregates all the previous groupings together.

It will be appreciated by an artisan of ordinary skill in the art that more or less sub-groupings can be used, and that the categories for these groupings can be varied by the service provider of the communication system 100 and/or customized by the subscriber by defining media preferences. In a first embodiment (I) a subscriber can select the "All" grouping which in turn opens another GUI window depicting all media programs in alphabetical order. When the subscriber selects a particular media program (e.g., "Program A"), a third GUI window is presented which shows all calendar viewing times and channels with call letters for said program. This grouping is generated by the redundancy scan and grouping steps 304-306 of FIG. 3. Similarly, the STB can be programmed to use the viewing history collected in step 302 to segregate previous viewings in another grouping ("Previous Viewings") to avoid crowding the other sub-groupings with shows already presented to the subscriber. Method 300 thus provides the subscriber a substantially more efficient means to navigate through media programs than the cumbersome EPG architecture used by prior art in which media programs are presented in a standard calendar format.

In a second embodiment (II) of FIG. 4 a subscriber can navigate through the MPG and select the "Movies" grouping which in turn presents a GUI window of media programs associated only with movies. As before selection of "Program A" generates another GUI window associated only with Program A and its viewing times in a calendar period. In a third embodiment (III) selecting the "Movies" generates a GUI window with movies subcategorized by genre (e.g., Action movies, Horror movies, and so on). Selection of the "Action" genre generates another GUI window with media programs associated with action movies. Selection of Program A presents yet another GUI window with the viewing times of said program in a calendar period.

It should be evident that "Program A" in the aforementioned three embodiments of FIG. 4 can be different media programs. It should also be evident to an artisan of ordinary sill in the art that any GUI presentation method can be used to present the sub-groupings shown in FIG. 4.

Referring back to FIG. 3, in step 310 the STB can monitor for a request for presentation of the MPG. If the request comes from a media controller 107 located in building 102, the MPG is presented by the STB in step 312 at a media presentation device such as shown in reference 108 of FIG. 1. Alternatively, the request for the MPG can arise from a remote access request generated by the portal 230 in step 314. In this embodiment, a portable communication device 116 roaming the communication system 100 of FIG. 1 (e.g., a cell phone or lap top) logs into a broadcast media portal 230 via an Internet browser in step 316. The computing devices 130 operate as a web server of the broadcast media portal which serve a multiplicity of subscribers of the IPTV, satellite, and/or cable system depicted by FIG. 1. The portable 230 can be accessed by common means (e.g., URL) and a subscriber account can be identified by a user's login information (e.g., username and password).

Once a subscriber has logged in, the portal 230 can be programmed to detect in step 318 a request from the Internet browser to navigate the MPG by way of the media receiver 106 (e.g., STB) associated with the subscriber. The request can arise from a selection of a GUI element in the portal 230 (e.g., a hypertext link or icon associated with the STB). In response to said request, the portal 230 can be programmed in step 320 to establish communications with the STB by way of the gateway 104 using a unicast channel of the IPTV network, or the ISP network 132. In this step, the portal 230 can supply authentication information to the gateway 104 to provide secure access to the STB 106. In step 322, the STB supplies the portal information associated by the MPG. In this step the portal 230 can reformat the MPG into an HTML format that is presented in step 324 at the Internet browser of the portable communication device 116. The MPG can be presented at the Internet browser according to the embodiments of FIG. 4.

Upon reviewing the aforementioned embodiments, it would be evident to an artisan with ordinary skill in the art that said embodiments can be modified, reduced, or enhanced without departing from the scope and spirit of the claims described below. For example, method 300 can be modified to remove all previously viewed media programs from the MPG. Method 300 can be applied to an EPG associated with a VoD catalog, DVR recordings, or any other suitable type of media program guides. Method 300 can also be utilized by other network elements of the media communication system 100, in which case the STB already receives a reorganized EPG and there is no need for the STB to perform the reorganization steps of method 300.

These are but a few examples of modifications that can be applied to the present disclosure without departing from the scope of the claims. Accordingly, the reader is directed to the claims section for a fuller understanding of the breadth and scope of the present disclosure.

Figure 5:
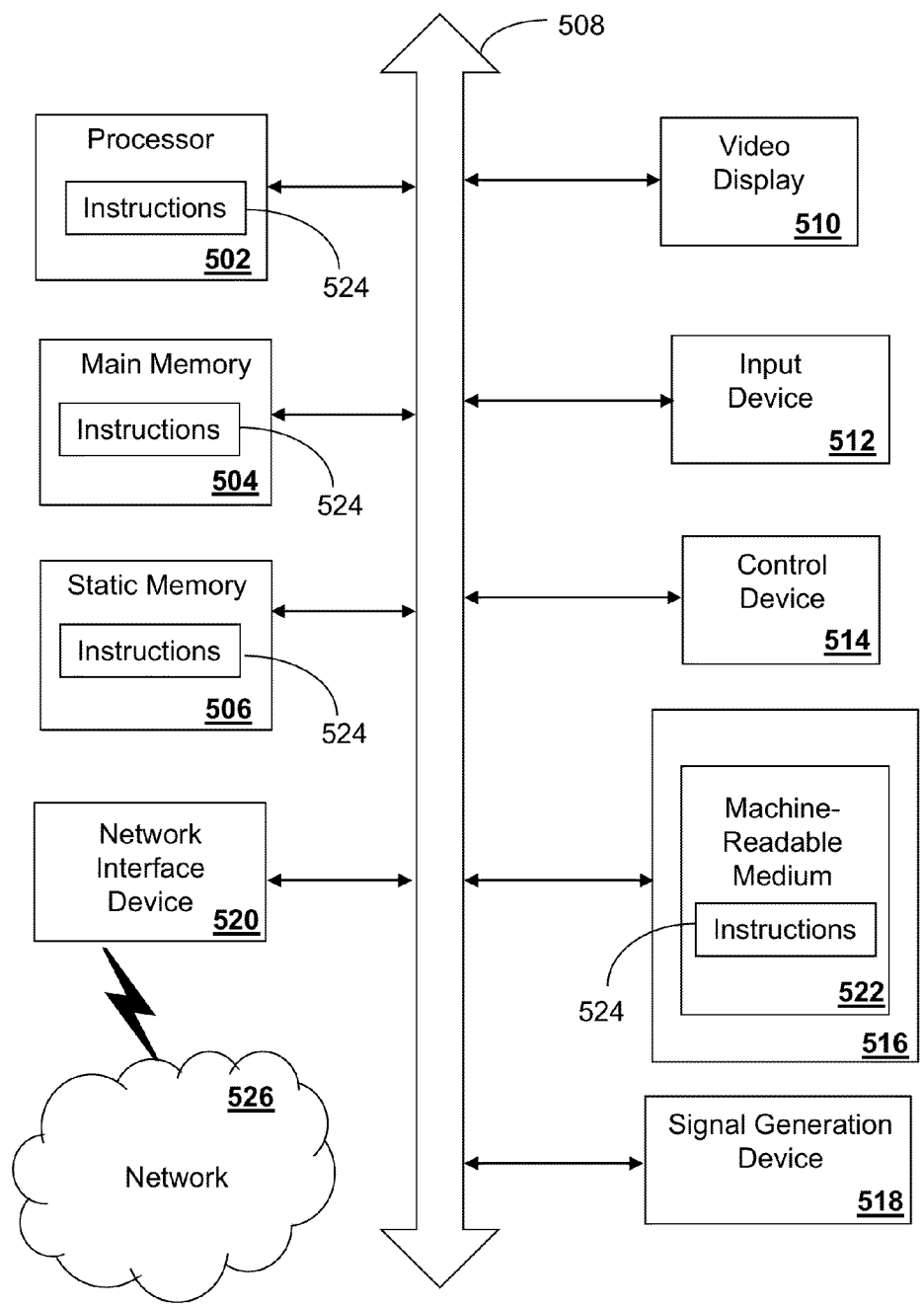
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   generating, by a media receiver including a processor, metadata representative of a viewing history of media programs that have been at least partially presented by the media receiver;
   providing, by the media receiver, the metadata to a remote server over a network;
   providing, by the media receiver to the remote server, a request for generating a reorganized electronic programming guide that is limited to available media programs that have not been viewed at the media receiver, wherein the request causes the remote server to reorganize and modify an electronic programming guide associated with the media receiver according to the viewing history to generate the reorganized electronic programming guide, wherein the reorganized electronic programming guide excludes the media programs that have been at least partially presented by the media receiver, and wherein the reorganized electronic programming guide collapses redundant media content into a single location in the reorganized electronic programming guide; and
   receiving the reorganized electronic programming guide at the media receiver without the media receiver reorganizing the reorganized electronic programming guide.

2. The method of claim 1, wherein the reorganized electronic programming guide organizes the available media programs that have not been viewed at the media receiver based on content genre.

3. The method of claim 1, comprising presenting the reorganized electronic programming guide at a display device coupled with the media receiver.

4. The method of claim 1, wherein the reorganized electronic programming guide includes recorded content.

5. The method of claim 1, wherein the reorganized electronic programming guide comprises video-on-demand content.

6. The method of claim 1, wherein the providing of the metadata to the remote server causes the remote server to provide the reorganized electronic programming guide to a mobile device.

7. The method of claim 1, wherein the reorganized electronic programming guide includes a plurality of sub-groupings comprising a plurality of genre groups, a plurality of media programs each placed in a corresponding genre group, and a plurality of viewing times for each of the plurality of media programs.

8. The method of claim 1, comprising performing text searches of the reorganized electronic programming guide.

9. A method comprising:
   receiving, by a portal processor, a request for generating a reorganized electronic programming guide that is limited to available media programs that have not been viewed at a media receiver,
   providing, by the portal processor, the request to a remote server that is remote from the media receiver, wherein the request causes the remote server to reorganize and modify an electronic programming guide associated with the media receiver according to a grouping of redundant media programs and according to a viewing history of media programs collected by the media receiver to generate the reorganized electronic programming guide, wherein the remote server removes from the reorganized electronic programming guide all previously viewed media programs at the media receiver, wherein the viewing history is stored at the media receiver and is based on media programs that have been at least partially presented by the media receiver;
   receiving, by the portal processor, the reorganized electronic programming guide from the remote server; and
   providing, by the portal processor, the reorganized electronic programming guide to a communication device for presentation by an Internet browser operating from the communication device without the communication device reorganizing the reorganized electronic programming guide.

10. The method of claim 9, wherein the request is received from the communication device.

11. The method of claim 9, wherein the reorganized electronic programming guide organizes according to content genre.

12. The method of claim 9, comprising providing the reorganized electronic programming guide to the media receiver for presentation at a display device coupled with the media receiver.

13. The method of claim 9, wherein the reorganized electronic programming guide includes recorded content.

14. The method of claim 9, wherein the reorganized electronic programming guide comprises video-on-demand content.

15. The method of claim 9, wherein the reorganized electronic programming guide includes a plurality of sub-groupings comprising a plurality of genre groups, a plurality of media programs each placed in a corresponding genre group, and a plurality of viewing times for each of the plurality of media programs.

16. The method of claim 9, wherein the providing of the reorganized electronic programming guide to the communication device enables the communication device to perform text searches of the reorganized electronic programming guide.

17. A server comprising:
   a memory to store computer instructions; and
   a processor coupled with the memory, wherein the processor, responsive to executing the computer instructions, performs operations comprising:
      determining a viewing history of media programs at a media receiver;
      receiving a request for a media guide;
      obtaining an electronic programming guide associated with the media receiver;
      scanning the electronic programming guide for redundant media programs;
      grouping the redundant media programs to generate grouped media programs at a single location based on the request; and reorganizing and modifying the electronic programming guide according to the grouped media programs and the viewing history to generate a reorganized electronic programming guide, wherein the reorganizing and modifying includes removing from the electronic programming the media programs identified by the viewing history as at least partially presented by the media receiver, and wherein the reorganized electronic programming guide is not subject to further reorganization by the media receiver.

18. The server of claim 17, wherein the viewing history is collected by and stored at the media receiver, wherein the determining of the viewing history is based on metadata received from the media receiver, and wherein the reorganized electronic programming guide includes a video-on-demand catalog and recorded content.

19. The server of claim 17, wherein the operations further comprise providing the reorganized electronic programming guide to a mobile device for presentation without the mobile device reorganizing the reorganized electronic programming guide.

20. The server of claim 19, wherein the request for the media guide is received via a remote web server based on an input to the mobile device in communication with the remote web server.

* * * * *